Jan. 19, 1943.   H. D. STEVENS   2,308,960
DISPENSING APPARATUS
Filed July 10, 1940

INVENTOR
Horace D. Stevens
BY
Ely & Frye
ATTORNEYS

Patented Jan. 19, 1943

2,308,960

UNITED STATES PATENT OFFICE 2,308,960

DISPENSING APPARATUS

Horace D. Stevens, Akron, Ohio, assignor to The Firestone Tire & Rubber Company, Akron, Ohio, a corporation of Ohio Application July 10, 1940, Serial No. 344,623

2 Claims. (Cl. 154—9)

This invention relates to dispensing apparatus, and more especially it relates to apparatus for dispensing measured quantities of material that is in flowable, viscous condition when heated.

The invention is of primary utility in the rubber industry for spewing a measured quantity of leak-proofing solution into an inner tube during the manufacture thereof, and for concurrently blowing air into the tube.

The chief objects of the invention are to provide for the concurrent delivery of liquid and air from the apparatus; to provide for maintaining the proofing solution in heated condition in all parts of the apparatus to prevent stiffening or solidification of the solution; to provide for accurate measurement of the liquid dispensed; and to provide readily for varying of the quantity of the liquid dispensed. Other objects will be manifest as the description proceeds.

Figure 1:
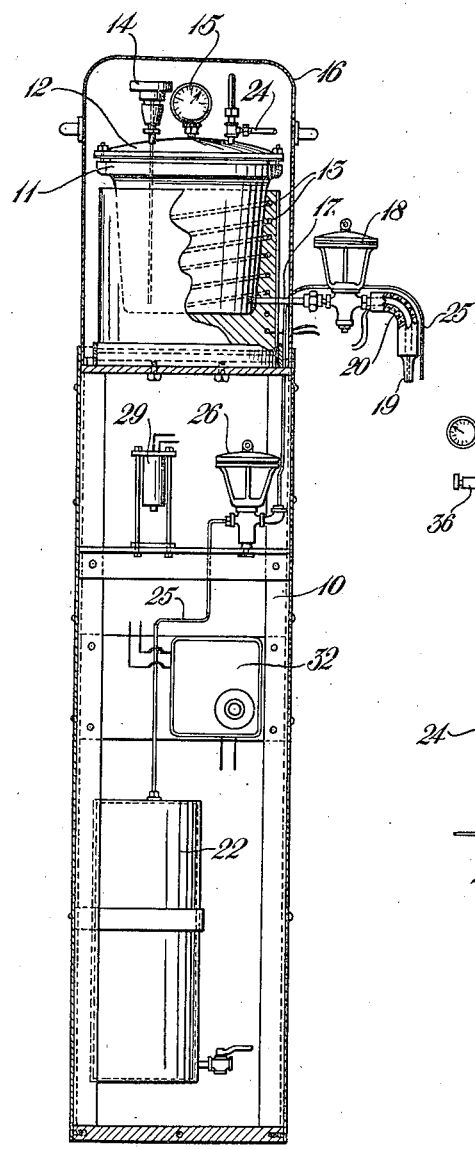
Figure 2:
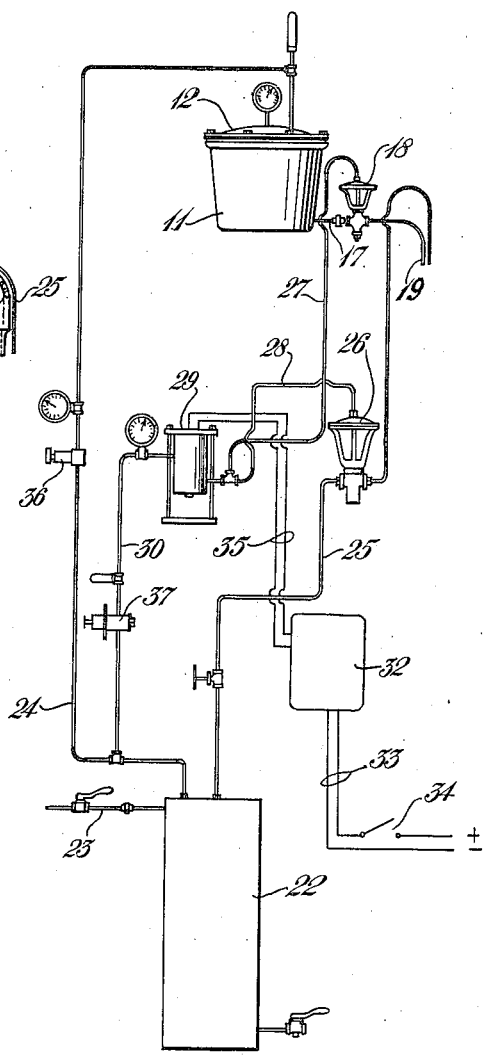

Of the accompanying drawing:

Figure 1 is an elevation of apparatus embodying the invention, parts being broken away and in section; and Figure 2 is a piping diagram of the apparatus.

Referring to the drawing, the apparatus shown comprises a framework 10 upon the top of which is mounted a container 11 having a removable cover 12 that has sealed engagement with the top of the container so that the contents of the latter may be subjected to super-atmospheric pressure. The container 11 is surrounded by electrically heated coils 13 by means of which the contents of the container is maintained at a determinate elevated temperature. A thermometer 14 extends through the cover 12 and into the interior of the container for indicating the temperature of the contents thereof, and a suitable gauge 15 is mounted on the cover for indicating the internal pressure in the container. Preferably the entire container structure and gauges described are covered by a removable casing 16 to conserve heat. Extending from the bottom of the container and through the casing 16 is a delivery pipe 17 having a pneumatically operated diaphragm valve 18 therein, the outer end of said pipe being provided with a downwardly directed nozzle 19 that is encased in an electric heating element 20, the arrangement being such that the liquid of the container is subject to heat up to its point of delivery from the apparatus.

Mounted in the bottom of the framework 10 is a reservoir 22 of air under super-atmospheric pressure, which air is delivered to the reservoir through an inlet pipe 23. Air is discharged from the said reservoir through two pipes 24, 25 respectively, of which pipe 24 extends through the cover 12 of container 11 whereby the contents of the latter is maintained under determinate pressure. The pipe 25 has its delivery end positioned beside the nozzle 19 of pipe 17, and a pneumatically operated diaphragm valve 26 in pipe 25 controls the passage of air therethrough. Pneumatic valves 18 and 26 are arranged to operate concurrently to effect the discharge of viscous liquid and air from the pipes controlled thereby, and to this end the respective valves are connected by pipes 27, 28 to the discharge port of a solenoid operated valve 29. The inlet port of the latter is connected to pipe 24 by means of a pipe 30. The solenoid valve 29 is mounted upon the framework 10 in the medial region thereof. Preferably control valves 36, 37 are located in the pipes 24, 30 respectively, for assuring uniform determinate pressure in the container 11 and to the solenoid valve 29.

Operation of the solenoid valve 29 is effected by a suitable timing device that is enclosed in a casing 32 that is mounted upon the framework 10 in the medial region of the latter. The timing device is electrically operated and may be of any standard or preferred construction so that a detail showing thereof is not believed to be required herein. The timing device is connected to a source of electrical energy by conductor wires 33, there being a manually operable switch 34 in the conductors 33, the closing of which switch causes the timing device to execute a cycle of operation. The said cycle of operation consists in delivering electrical energy to the solenoid valve 29 for a determinate time interval, there being conductor wires 35 connecting the timer to said valve for this purpose.

The operation of the apparatus is as follows. The heating elements 13 and 20 normally are energized to maintain the proofing material in container 11 in viscous condition. The electric switch 34 normally is open, the solenoid valve 29 normally is in closed condition, and air pressure in the reservoir 22 normally maintains pressure upon the proofing material in the container 11 through the agency of the pipe 24. An inner tube to be proofed comes to the apparatus in unvulcanized condition and before its ends have been spliced together, the tube usually being in transversely flat condition with its wall collapsed. The operator opens one end of the tube, holds the open end thereof so that the nozzle 19 and delivery end of pipe 25 extend thereinto, and then momentarily closes the switch 34 to set the timing device in operation. The timing device energizes the solenoid valve 29 to open the same, thereby admitting air under pressure from the reservoir 22 to the pipes 27 and 28, with the result that pneumatic valves 18 and 26 are concurrently operated to open pipes 17 and 25. This enables proofing material from the container 11 to discharge through the nozzle 19 into the inner tube, and air from the reservoir 22 to discharge from the pipe 25 into the inner tube. After a determinate time interval the timer effects the deenergizing of solenoid valve 29 to close the same and thereby to operate valves 18 and 26 to close off the flow of proofing material and air to the inner tube. This completes a cycle of operation of the apparatus. The operator then closes the end of the inner tube to retain the proofing material and air therein until the ends of the tube are spliced together to give it annular form.

The invention is automatic in operation, requiring only that the switch 34 be closed momentarily to effect a cycle of operation. The amount of proofing material discharged from the container 11 at each operation is governed by the size of the delivery pipe 17, the internal pressure in the container 11, and the length of time that the valve 18 is open. Since the first two factors are constant, it will be apparent that the quantity of material delivered by the apparatus may be varied by varying the time interval of discharge, this being accomplished readily by adjustment of the timing device.

Modification may be resorted to without departing from the spirit of the invention, or the scope thereof, as defined by the appended claims.

What is claimed is:

1. In apparatus for use in the internal liquid coating of tire inner tubes, the combination of a closed container including a discharge pipe for liquid contained therein, a compressed air discharge pipe positioned beside the container discharge pipe so that they may be inserted together into a tire inner tube during manufacture thereof, means for maintaining pressure on the liquid in the container, means to control the opening and closing of said liquid and compressed air discharge pipes, said means comprising a valve common to the two discharge pipes, and means for opening said valve and automatically closing the same after the lapse of a determinate time interval for discharging air and liquid in determinate amounts into said inner tube.

2. In apparatus for use in the internal liquid coating of tire inner tubes, the combination of a closed container including a discharge pipe for liquid contained therein, a compressed air discharge pipe positioned beside the container discharge pipe so that they may be inserted together into a tire inner tube during the manufacture thereof, means for maintaining pressure on the liquid in the container, a valve to control the opening and closing of said liquid and compressed air discharge pipes, and means for opening said valve and automatically closing the same after the lapse of a determinate time interval for discharging air and liquid in determinate amounts into said inner tube.

HORACE D. STEVENS.